UNITED STATES PATENT OFFICE.

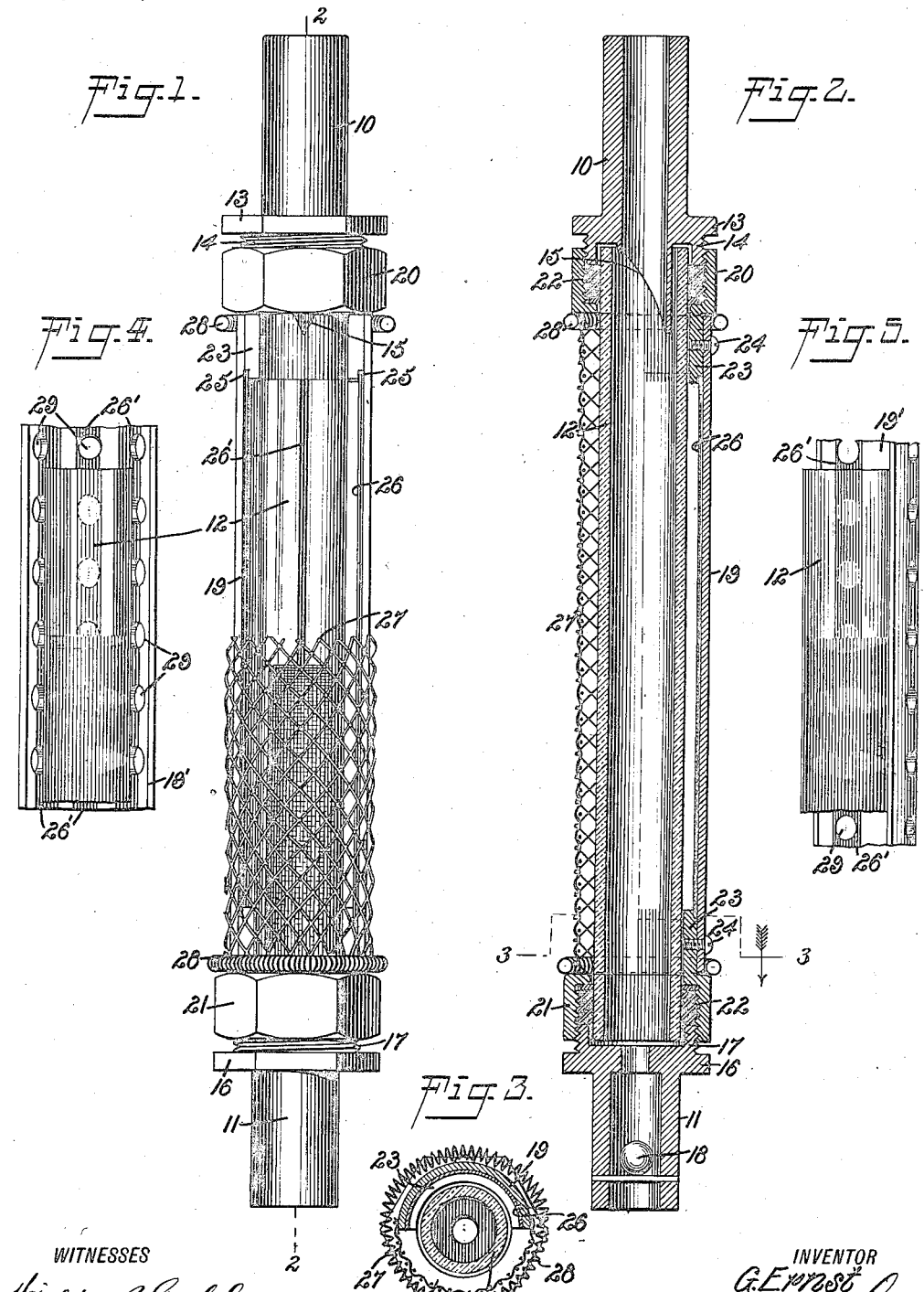

GEORGE ERNST, OF NEWARK, NEW JERSEY.

SAFETY GAGE-GLASS.

1,225,604.             Specification of Letters Patent.             Patented May 8, 1917.

Application filed June 1, 1916.   Serial No. 101,045.

*To all whom it may concern:*

Be it known that I, GEORGE ERNST, a citizen of the United States, and a resident of Newark, in the county of Essex and State of New Jersey, have invented a new and Improved Safety Gage-Glass, of which the following is a full, clear, and exact description.

This invention relates to gage glasses for steam boilers or the like of the nature covered by Letters Patent of the United States, No. 1,164,484, issued to me on the 14th day of December, 1915.

Among the objects of the present invention is to simplify this type of device and improve the same in several important parts, having reference especially to increased safety, plainer legibility of the water level, and facility for adapting the gage device to differently spaced stuffing nuts.

Among the objects of this invention, therefore, is to provide a gage glass frame of simple partial tubular form adapted to be cut to any desired length, and having means to connect the ends thereof to stuffing nut devices.

Another object of the invention is to improve the centralizing device making it an integral part of the upper connecting nipple.

A still further object is to provide a guard for the gage glass providing for flexibility in the event of internal bursting pressure.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a front elevation of my improved gage glass with a portion of the guard broken away;

Fig. 2 is a vertical longitudinal section on the line 2—2 of Fig. 1;

Fig. 3 is a horizontal section on the line 3—3 of Fig. 2;

Fig. 4 is a front elevation of a modified form of the same construction showing the contrasting appearance at the water level and above and below the same; and Fig. 5 is a three-quarter side elevation of the same indicating the contrasting appearance as viewed from the side.

Referring now more particularly to the drawings, I show upper and lower connecting nipples 10 and 11 respectively, the barrel portions of which are of the same diameter and equivalent in caliber to the outside diameter of the standard gage glass, a section of which is indicated at 12. The upper nipple is provided with a hexagonal shoulder 13 from which there extends downwardly an externally threaded socket 14 within which the upper end of the glass 12 projects loosely or out of contact with any part of the metal. The nipple 10 has a central bore and surrounding the lower end of the bore and providing an elongation thereof, is a centralizing device 15 serving to deliver the water of condensation entering the gage glass down into the central portion of the gage glass out of contact with the glass itself. This centralizing device is turned as an integral part of the nipple 10.

The lower nipple 11 has a hexagonal shoulder 16 and from it there projects upwardly an externally threaded socket 17, into which the lower end of the glass projects loosely out of contact with the metal. This nipple also is centrally bored and fitted with a safety ball 18, as shown in my previous patent.

The frame of this gage glass comprises three principal parts, namely, a tubular back 19 of uniform cross section, and hence adapted to be cut of any desired length, and also upper and lower stuffing sockets 20 and 21 connected to the upper and lower ends of the back 19. These sockets are internally threaded to coöperate directly with the socket extensions 14 and 17 respectively, a suitable number and species of packing washers 22 being fitted within the stuffing sockets and holding the ends of the tube in their perfectly steamtight condition free from all metal. Each of the socket pieces 20 and 21 is provided with a neck 23 of substantially semi-cylindrical form projecting toward the other socket piece. It may be observed in this connection that the socket pieces 20 and 21 are duplicates, and for this reason also the structure is cheapened and simplified. The necks 23 are connected to the ends of the back 19 by any suitable removable fasteners indicated as machine screws 24. The free edges of the necks 23 or the edges remote from the main portions of the socket pieces are rabbeted at 25 on the outside adjacent the inner surface of the back 19, whereby there is provided a guideway for a card 26 of any suitable nature adapted to be slid along the guide circumferentially of the glass, the card being of a length equal to the distance between the bottoms of the rabbeted portions. This card is designed to be marked in some suitable manner whereby the water in the glass acting as a magnifier will intensify the marking and thereby facilitate the reading of the glass. I prefer for this purpose a small red stripe 26' extending vertically along the middle portion of the card, the stripe having a width of approximately three-sixteenths of an inch for an ordinary glass. This stripe has the effect of making the whole column of water appear red as viewed from the front.

With the construction described, for replacing a glass tube 12 it is not necessary to remove the nipples from their stuffing nuts or fittings. All that is necessary to do is to loosen the nipples so that either of them may be moved endwise slightly, and then upon disconnecting the stuffing sockets 20 and 21 from the extensions 14 and 17, the entire frame with the glass therein may be manipulated independently of the nipples.

Under ordinary practice no special guard means is necessary for the glass, but where the guard is required, I prefer to employ a piece of reticulated metal, as indicated at 27, of a length equal to the distance between the main portions of the socket pieces 20 and 21 and of any suitable width circumferentially, preferably somewhat overlapping the sides of the back 19, see Fig. 3. This guard may be held in place by means of spiral spring elastics 28 surrounding the upper and lower ends thereof just adjacent the socket pieces. In the event of rupture due to internal pressure, the springs 28 will be extended to compensate for the internal pressure, but will immediately return the guard to normal position after the pressure has been expended and there is no danger from the result of fragments of the glass being thrown from the device.

In the modified form of the semi-tubular back 19', indicated in Figs. 4 and 5, vertical rows of circular holes 29 are formed. Any suitable number of these rows of holes may be formed and a colored stripe 26' is formed along each vertical row. In the upper half of each of these detail figures, the empty glass tube indicates the vertical elongation of the holes, while in the lower half of each figure, the presence of the water in the glass causes the transverse elongation of the holes. This fact very strongly marks the water level. The color effect of the stripe 26', as in the other form of the invention, is augmented, and hence that portion of the back that is imperforate appears in solid color and dark, while the holes provide for the transmission of light through the back from all directions. Fig. 5 is especially useful in indicating that the water level is plainly visible from any angle around the front or sides of the gage glass.

I claim:

1. In a safety gage glass, the combination of end nipples each having an externally threaded socket extension directed toward the other, a frame comprising socket pieces having threaded connection with said nipple extensions and each having a semi-cylindrical integral neck projecting toward the other, said frame also including a semi-cylindrical back, detachable fasteners securing its ends rigidly to said semi-cylindrical necks, and a gage glass extending freely through the socket members and into the nipple sockets out of contact with the parts aforesaid.

2. In a safety gage glass of the character set forth, the combination with a gage glass tube, of a metal frame therefor comprising end socket pieces into which the ends of the tube project and also including a frame back of segmental tubular form extending from one socket piece to the other, each socket piece having a neck projecting toward the other to which the adjacent end of the back is rigidly secured, a reticulated guard member embracing the open side of the tube and extending from one socket piece to the other, and a pair of elastic rings surrounding the ends of the same and the ends of the frame holding the reticulated member resiliently in place.

3. In a safety gage glass of the character set forth, the combination with a gage glass tube, of a frame therefor comprising upper and lower end socket pieces and a rigid semi-cylindrical back extending from one socket piece to the other and secured rigidly thereto, said back being provided with a vertical series of holes passing therethrough for the passage of light, each socket piece having a neck projecting toward the other to which the back is connected, means carried by the inner surface of the back along said holes to intensify the disparity of visual effect above and below the water line, and means coöperating with the socket pieces to make steam-tight connection therewith and holding the ends of the glass tube out of contact with the parts aforesaid.

GEORGE ERNST.